(12) United States Patent
West et al.

(10) Patent No.: US 6,337,383 B1
(45) Date of Patent: Jan. 8, 2002

(54) POLYSILOXANE POLYMERS WITH MULTIPLE OLIGOOXYETHYLENE SIDE CHAINS

(75) Inventors: Robert C. West, Madison, WI (US); Richard Hooper, Brighton (GB); David A. Moline, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/517,821

(22) Filed: Mar. 2, 2000

Related U.S. Application Data

(60) Provisional application No. 60/123,795, filed on Mar. 11, 1999.

(51) Int. Cl.[7] .............................................. C08G 77/14
(52) U.S. Cl. .............................. 528/29; 528/15; 528/31; 528/10; 556/445
(58) Field of Search ............................ 556/445; 528/29, 528/31, 15, 10

(56) References Cited

U.S. PATENT DOCUMENTS

| | | | | |
|---|---|---|---|---|
| 3,172,899 A | * | 3/1965 | Bailey | 556/445 |
| 3,530,159 A | * | 9/1970 | Guinet et al. | 556/445 |
| 5,475,127 A | * | 12/1995 | Klein et al. | 556/445 |
| 5,593,787 A | * | 1/1997 | Dauth et al. | 428/447 |

FOREIGN PATENT DOCUMENTS

| | | |
|---|---|---|
| DE | 4330735 | 3/1995 |
| EP | 0311348 | 4/1989 |
| EP | 0398684 | 11/1990 |

OTHER PUBLICATIONS

Encyclopedia or Polymer Science and Engineering, vol. 15, pp. 211, 218, 220, 221. 1989.*
D. Fish et al., Polymer Electrolyte Complexes Of $LiClO_4$ And Comb Polymers Of Siloxane With Oligo–oxyethylene Side Chains, 20 British Polymer Journal 281–288 (1988).
H. Allcock et al., Polyphosphazenes Bearing Branched And Linear Oligoethyleneoxy Side Groups As Solid Solvents For Ionic Conduction, 29 Macromolecules 7544–7552 (1996).
M. Ouchi et al., Convenient And Efficient Tosylation Of Oligoethylene Glycols And The Related Alcohols In Tetrahydrofuran–Water In The Pressende Of Sodium Hydroxide, 63 T. Bull Chem. Soc, Jpn. 1260–1262 (1990).
C. Van Walree et al., "Poly(4, 7, 10–trioxaundecylmethylsilylene) and Poly (4, 7, 10, 13–tetraoxatetradecylmethylsilylene) : Noninonic Water–Soluble Polysilylenes", Dec. 4, 1995, pp. 8696–8698.

* cited by examiner

*Primary Examiner*—Margaret G. Moore
(74) *Attorney, Agent, or Firm*—Quarles & Brady LLP

(57) ABSTRACT

Disclosed herein are solid polysiloxane polymers having multiple oligooxyethylene side chains per silicon. The multiple oligooxyethylene side chains are each directly connected to the silicons, or they can be linked by a branching structure and then jointly linked to the silicons. Methods for producing these compounds, and intermediates which are disubstituted silicon compounds, are also disclosed. These materials are highly conductive, and thus appear particularly useful in lithium automotive batteries.

15 Claims, 6 Drawing Sheets

POLYSILOXANE POLYMERS WITH MULTIPLE OLIGOOXYETHYLENE SIDE CHAINS

CROSS-REFERENCE TO RELATED APPLICATION

This application claims priority based on U.S. provisional application No. 60/123,795, filed on Mar. 11, 1999.

STATEMENT REGARDING FEDERALLY SPONSORED RESEARCH

This invention was made with United States government support awarded by the following agency: NSF 9531155. The United States has certain rights in this invention.

BACKGROUND OF INVENTION

The present invention relates to polysiloxane derivatives which have desirable electronic properties. More particularly, it relates to polysiloxanes in which at least one of the silicons is substituted with multiple oligooxyethylene side chains.

Lithium batteries are particularly useful in connection with computers because, among other things, they deliver high levels of power per unit weight. As the technology advances for electrically powered automobiles, there has been some thought of using lithium based batteries for that application as well.

However, most existing lithium batteries contain a liquid such as polyethylene oxide that acts as an electrolyte. If such batteries were to be used in automobiles there would be some risk that an accident (or another event) might cause a leak, with resulting safety and environmental concerns.

For this reason, there has been some thought of using a solid electrolyte with a lithium-based battery system. While polyethylene oxide is a sufficiently conductive material as a liquid, its conductivity in solid form is too low to be practical for this application.

One group tried preparing a polysiloxane derivative in which methylated silicons in the polysiloxane chain were each further substituted with a single oligooxyethylene side chain. See D. Fish et al., 20 Brit. Poly. Journ. 281–288 (1988). The disclosure of this publication and of all other publications referred to herein are incorporated by reference as if fully set forth herein. This created a material that was tried as an electrolyte. Unfortunately, the material was not conductive enough to be commercially competitive.

H. Allcock et al., 29 Macromol. 7544–7552 (1996) proposed polyphosphazenes bearing branched and linear oligo-ethyleneoxy side groups as solid solvents for ionic conduction. However, certain properties of these materials led them to be less than optimal for use in connection with lithium automotive batteries.

Thus, it can be seen that a need still exists for an improved solid electrolyte conductors for use with lithium-based batteries.

BRIEF SUMMARY OF THE INVENTION

In one aspect, the invention provides compounds containing the following moiety:

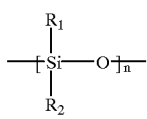

wherein each of $R_1$ and $R_2$ is individually selected for each n and is —$CH_2CH_2CH_2$—O—$(CH_2CH_2O)_m$—; wherein m is individually selected for each $R_1$ and $R_2$ and each n and is at least 2 and less than 100 (preferably 3 to 20); and n is at least 1 (preferably at least 2) and less than 1000 (preferably 15–100). In one form, m is the same for all $R_1$ and $R_2$ and all n's.

In another aspect, the invention provides compounds containing the following moiety:

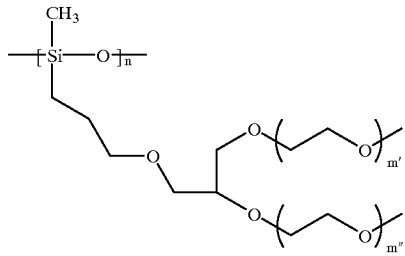

wherein m' and m" are each individually selected and are each at least 2 and less than 100 (preferably 3 to 20); and n is at least 1 (preferably at least 2) and less than 1000 (preferably 15–100). In one form, m' and m" are the same as each other, and are the same for all n's.

The invention also provides compounds containing the following moiety:

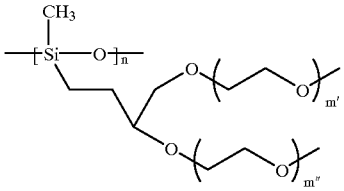

wherein m' and m" are each individually selected and are each at least 2 and less than 100 (preferably 3 to 20); and n is at least 1 (preferably at least 2) and less than 1000 (preferably 15–100). In one form, m' and m" are the same as each other, and are the same for all n's.

In still another aspect, the invention provides compounds containing the following moiety:

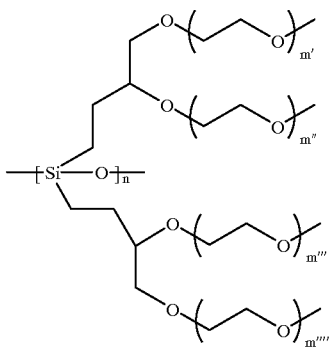

wherein m', m", m'", and m"" are each individually selected for each n and each is at least 2 and less than 100 (preferably 3 to 20); and n is at least 1 (preferably at least 2) and less than 1000 (preferably 15–100). In one form, m', m", m'", and m"" are the same for all n's.

In still another aspect, the invention provides compounds containing the following moiety:

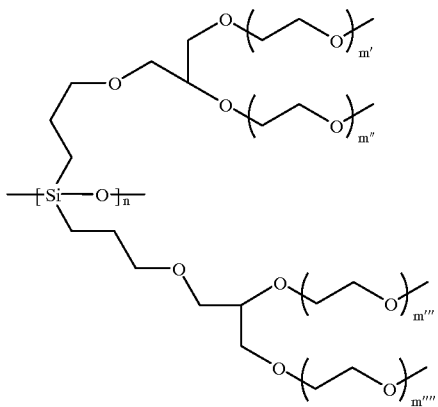

wherein m', m", m'", and m"" are each individually selected for each n and each is at least 2 and less than 100 (preferably 3 to 20); and n is at least 1 (preferably at least 2) and less than 1000 (preferably 15–100). In one form, m', m", m'", and m"" are the same for all n's.

These moieties can be part of materials that are entirely polysiloxane, or they can be linked with other organic or inorganic materials. Preferably, such moieties are terminated with an OH or $OSiMe_3$ group, but may also be terminated with a wide variety of terminus groups linked to the chain Si or O, such as branched or unbranched alkyl having less than 30 carbons, alkoxy having less than 30 carbons, alkyl silyl having less than 30 carbons, arylalkyl having less than 30 carbons, and aryl having less than 30 carbons.

Particularly with respect to the first class of such compounds it has been learned that oxygen content of ten to twelve oxygens for at least one n is highly preferable from a conductivity standpoint. It has also been learned that where a single n contains multiple oligooxyethylene branches, the branches can be tied together at both ends (e.g. by a crown ether connection to form a cyclic compound $—CH_2CH_2$ linkage).

In another aspect, the invention provides a compound of the formula $R_1R_2SiCl_2$; wherein $R_1$ is $-CH_2CH_2CH_2—O—(CH_2CH_2O)_{m'}—T$; wherein $R_2$ is $—CH_2CH_2CH_2—O—(CH_2CH_2O)_{m''}—T$; wherein m' and m" are each individually selected and are each at least 2 and less than 100 (preferably 3 to 20); and wherein T is individually selected for $R_1$ and $R_2$ and are selected from the group consisting of hydrogen, halogen, alkyl having less than 30 carbons, alkyl silyl having less than 30 carbons, arylalkyl having less than 30 carbons, and aryl having less than 30 carbons. One preferred T group is methyl.

In another aspect the invention provides a method of making such polysiloxane "comb" polymers by polymerizing multiple $R_1R_2SiCl_2$ molecules in the presence of water. The term "comb" is used because the side chains make the molecule appear somewhat like a hair comb when the molecule is depicted in written form.

Our compounds were tested for conductivity. They had surprisingly high conductivity, while retaining a number of important characteristics that are desirable with respect to automotive batteries.

The objects of the present invention therefore include providing:

(a) compounds of the above kind which are solids;
(b) compounds of the above kind which are highly electrically conductive;
(c) intermediate compounds useful in making the above compounds; and
(d) efficient methods of making such compounds.

These and still other objects and advantages of the present invention will be apparent from the description which follows. The following description is merely of the preferred embodiments. The claims should therefore be looked to in order to understand the full scope of the invention.

DETAILED DESCRIPTION OF THE INVENTION

I. Multiple Linear Side Chains

Figure 1:
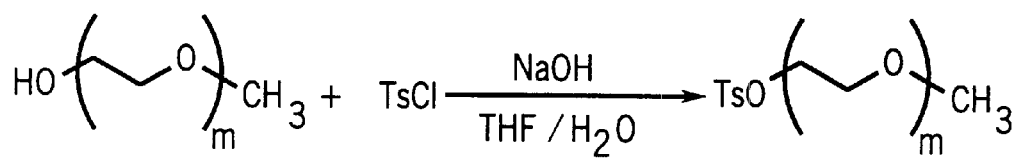
FIG. 1 is a schematic depiction of the synthesis of tosylate intermediates that are useful in creating compounds of the present invention.

General procedures for the synthesis of tosylated oligoethylene glycols are described in M. Ouchi et al. 63 Bull. Chem. Soc. Jpn. 1260 (1990). In our case, tosylate compounds depicted in FIG. 1 (with varying m values) were created either following, or in a manner analogous to the following procedures.

Sodium hydroxide (80 g. 2.0 mol) dissolved in water (400 mL) and oligoethylene glycol monomethyl ether (1.4 mol) in THF (400 mL) were placed in a flask and the mixture was cooled on an ice bath with magnetic stirring. To the mixture was added dropwise p-toluenesulfonyl chloride (243 g. 1.3 mol) in THF (400 mL) over 2 hours with continuous stirring and cooling. The solution was stirred for a further 2 hours and then poured onto ice-water (1 L). This mixture was then extracted twice with methylene chloride (400 mL) and the combined organic extracts were washed twice with water (1 L) and once with saturated aqueous sodium chloride solution (400 mL), and then dried over anhydrous magnesium sulphate. Upon evaporation of the solvent the required tosylate intermediate was obtained. See generally FIG. 1.

Figure 2:
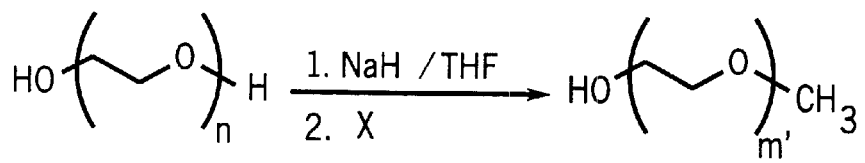
FIG. 2 is a schematic depiction of the synthesis of alcohol intermediates that are useful in creating compounds of the present invention.

As depicted in FIG. 2, we then synthesized other intermediates necessary for our syntheses. Note that general procedures for synthesizing longer chain oligo(ethylene glycol) monomethyl ethers are described in H. Allcock et al., 29 Macromolecules 7544 (1996).

The techniques we used were identical to or analogous to the following. We synthesized 2-(2-(2-(2-(2-(2-methoxyethoxy)ethoxy)ethoxy)ethoxy)ethoxy)ethanol as follows.

To a suspension of NaH (3.6 g. 0.12 moles) in THF (200 mL) was added a solution of triethylene glycol (15.02 g, 0.1 moles) in THF (100 mL). This mixture was stirred at room temperature for about 1 hour. A solution of 2-(2-(2-(methoxyethoxy)ethoxy)ethyl p-toluenesulfonate (31.84 g, 0.1 moles) in THF (150 mL) was slowly added to this mixture. The reaction mixture was stirred at room temperature overnight during which time a heavy white precipitate had formed. This reaction mixture was then heated to reflux for 6 hours and allowed to cool. The mixture was filtered to remove inorganic salts and the filtrate concentrated on a rotary evaporator. The residue was re-dissolved into chloroform (150 mL) and extracted twice with a saturated solution of sodium chloride, dried with anhydrous magnesium sulfate and again concentrated under reduced pressure to give a dark yellow oil. The crude product was distilled under reduced pressure to yield the FIG. 2 product as a pale yellow oil (17.05 g, 57.5%)(bp 150° C., 0.06 torr) (see FIG. 1).

A FIG. 2 compound was made as follows. Tetraethylene glycol (48.59g, 0.25 mol) in THF (150 mL) was added to flask and the flask was placed in an ice bath. Sodium hydride (7.5g of 80% sodium hydride dispersion in mineral oil, 0.248 mol) in THF (200 mL) was added dropwise to the flask and the reaction was stirred for 2 hours at 0° C. 2-(2-(2-methoxyethoxy)ethoxy) ethoxy)ethyl p-toluenesulfonate (see FIG. 1) (80.94 g, 0.265 mol) in diethyl ether (200 mL) was added dropwise to the flask at 0° C. After complete addition, the reaction mixture was warmed to room temperature and stirred for 24 hours. The mixture was filtered to remove salts and rinsed with diethyl ether. The diethyl ether and THF were removed by vacuum. The resulting solution was poured into water and any unreacted toluenesulfonate was extracted with toluene. The product was then extracted from the aqueous layer with chloroform. Tosylate salts and unreacted tetraethylene glycol remain in the aqueous layer. The solution was concentrated under reduced pressure to yield the product (58.3 g, 68.9%). The product was of sufficient purity after extraction that no other purification was needed.

Figure 3:
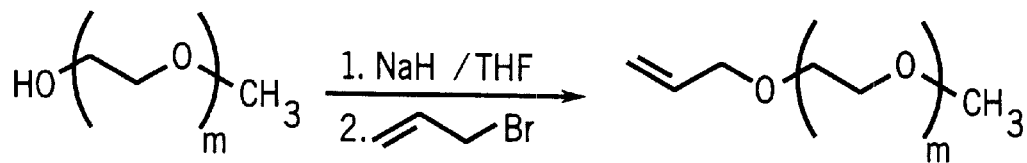
FIG. 3 is a schematic depiction of the synthesis of allyl ether intermediates that are useful in creating compounds of the present invention.

We next synthesized 2-(2-(2-(2-methoxyethoxy)ethoxy) ethoxy)allylether. This is depicted in FIG. 3.

Triethylene glycol monomethyl ether (8.21 g, 50 mmoles) in THF (30 mL) was slowly added to a solution of sodium hydride (1.8 g, 60 mmoles, 80% suspension) in THF (30 mL) at 0° C. This solution was stirred at room temperature for a further 2 hours. Addition of allyl bromide (12.1 g, 0.1 moles) in THF (40 mL) over a 30 minute period caused a white precipitate to form and this mixture was stirred at room temperature for a further 2 hours. The mixture was filtered and solvent removed under reduced pressure to yield a yellow oil. This was dissolved into methylene chloride (100 mL) and extracted 3 times with water, dried with magnesium sulfate and the solvent removed again under vacuum. A pale yellow oil was isolated (5.85 g, 57%) and was used without further purification since proton NMR integration showed the material to be of sufficient purity.

Figure 4:
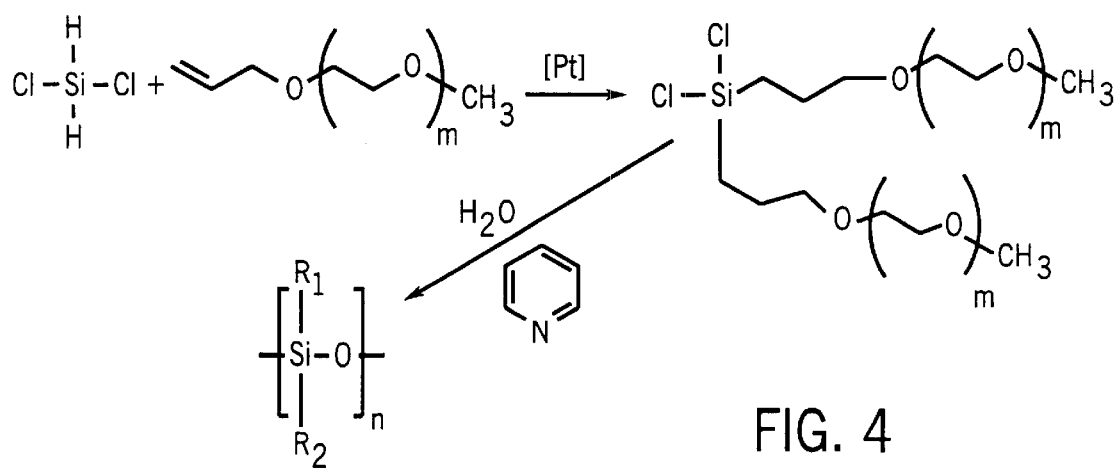
FIG. 4 is a schematic depiction of the synthesis of polymers of the present invention in which each silicon is substituted with two oligooxyethylene side chains.

As further depicted in FIG. 4, we then synthesized bis (ω-methoxy tri(oxyethylene)propyl)dichlorosilane.

An oven-dried 1-neck 250 mL Schlenk flask, with a magnetic stir bar was attached to a nitrogen inlet. Tri (ethylene glycol)allylmethylether (FIG. 3) (41.12 g, 0.20 mol) was syringed into the flask and cooled to 0° C. in an ice bath. Hexachloroplatinic acid (0.2 mL of $1\times10^{-2}$ M solution in isopropanol) was syringed into the flask followed by a 25% dichlorosilane solution in xylene (40 g, 0.10 mol). The ice bath was removed and the flask was placed in liquid nitrogen to freeze the reaction mixture. A vacuum was pulled on the flask to reduce the pressure. The stopcock was closed and the reaction mixture was allowed to warm to room temperature.

The reaction mixture was then heated to 60° C. and stirred for 12 hours after which time the reaction was complete. The dialkyldichlorosilane was purified by heating under vacuum at 150° C. to remove xylene, unreacted allylmethyl ether and other side products, specifically hydrogenated olefin. Similar procedures can be used to create other bis(ω-methoxy oligo(oxyethylene)propyl) dichlorosilanes.

We then polymerized the bis(ω-methoxy tri(oxyethylene) propyl)dichlorosilane (10 g) by syringing it into a Schlenk flask, and a water/pyridine mixture (1:2 mol ratio) was added dropwise. The reaction was stirred for 1 hour. The excess water/pyridine mixture was removed under reduced pressure. Diethyl ether was added to the resulting slurry which precipitated pyridinium chloride which was then filtered off. Diethyl ether was removed under reduced pressure yielding the polymer (see FIG. 4). A GPC of this product showed only one broad peak (Mw~7,000) and $^{29}$Si NMR spectroscopy showed one main peak ($\delta$=−21.6 ppm).

II. Single Side Chain With Multiple Branches

Figure 5:
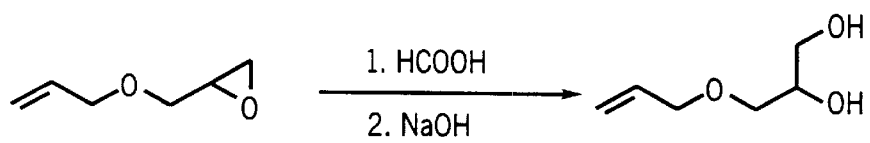
FIG. 5 is a schematic depiction of the synthesis of two alternative branched alcohol intermediates that are useful in creating compounds of the present invention.
Figure 5:
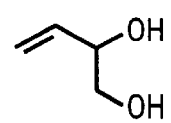

As initial intermediates for the creation of the branched side chains we created the FIG. 5 compounds. In this regard, synthesis of 3-allyloxy-1,2-propanediol was achieved as follows.

Allyl glycidyl ether (Aldrich) (57 g, 0.5 moles) was added dropwise to 99% formic acid (41.5 mL, 1.1 moles). The reaction mixture was then stirred and the temperature maintained below 25° C. This solution was then stirred at room temperature overnight. A solution of sodium hydroxide (50 g, 1.25 moles) in 65 mL of water was added slowly and the temperature kept below 40° C. The organic fraction was separated and the aqueous phase extracted several times with methylene chloride. The combined organic fractions were dried (MgSo$_4$) and evaporated under reduced pressure. The residue was distilled under vacuum to give a colorless oil (28.66 g, 43%)(bp 96° C., 0.5 torr). See the first compound on the right side of FIG. 5. 3-butene-1,2-diol was purchased from Aldrich. See the second compound on the right side of FIG. 5.

Figure 6:
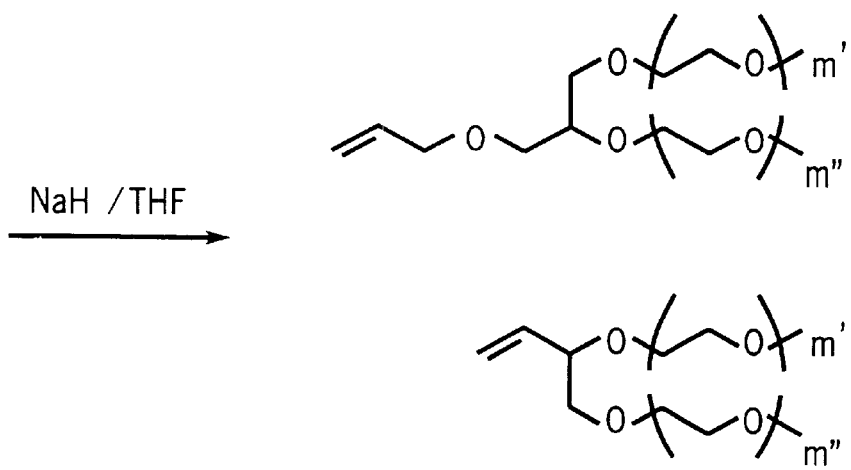
FIG. 6 is a schematic depiction of the synthesis of two alternative types of branched ether intermediates that are useful in creating compounds of the present invention.

As depicted in FIG. 6, we then used the FIG. 5 compounds to create the FIG. 6 compounds. In this regard we synthesized 1-allyl-2,3-bis(2-(2-(2-methoxyethoxy)ethoxy) ethoxy) propane as follows.

A FIG. 1 tosylate (with m=2)(52.0 g, 0.19 moles) was added to a mixture of 3-allyloxy-1,2-propanediol (FIG. 5), (13.2 g, 0.1 moles) and sodium hydride (9 g, 0.3 moles of a 80% by weight solution in mineral oil) in refluxing THF (500 mL). The reaction mixture was stirred, heated, and maintained at reflux under an atmosphere of dry nitrogen for 24 hours. The mixture was cooled and filtered, and the solvent was removed under reduced pressure. The residue was extracted with chloroform, dried (MgSO$_4$) and filtered. The solvent was again removed under reduced pressure to yield a dark brown oil. This brown oil was dissolved in 200 ml of water and then extracted with methylene chloride (3×75ml), dried with MgSO$_4$, and the solvent was removed under reduced pressure to provide a pale yellow oil (33.8 g—42%) See the upper compound in FIG. 6.

We next synthesized 3,4-bis(2-(2-(2-methoxyethoxy) ethoxy)ethoxy)butene. A FIG. 1 tosylate (m=2)(31.83 g, 0.10 mol) was added to a mixture of 3-butene-1,2-diol (FIG. 5), (4.44 g, 0.05 mol) and sodium hydride (4.7 g, 0.156 mol of a 80% by weight solution in mineral oil) in refluxing THF (125 mL). The reaction mixture was stirred, heated, and maintained at reflux under an atmosphere of dry nitrogen for 48 hours. The mixture was cooled and filtered, and THF was removed under reduced pressure. The residue was added to water and the product was extracted with toluene, dried (MgSO$_4$) and filtered. The solvent was again removed under reduced pressure to yield a pale yellow oil (15.35 g, 80.7%). See the lower compound in FIG. 6.

Figure 7:
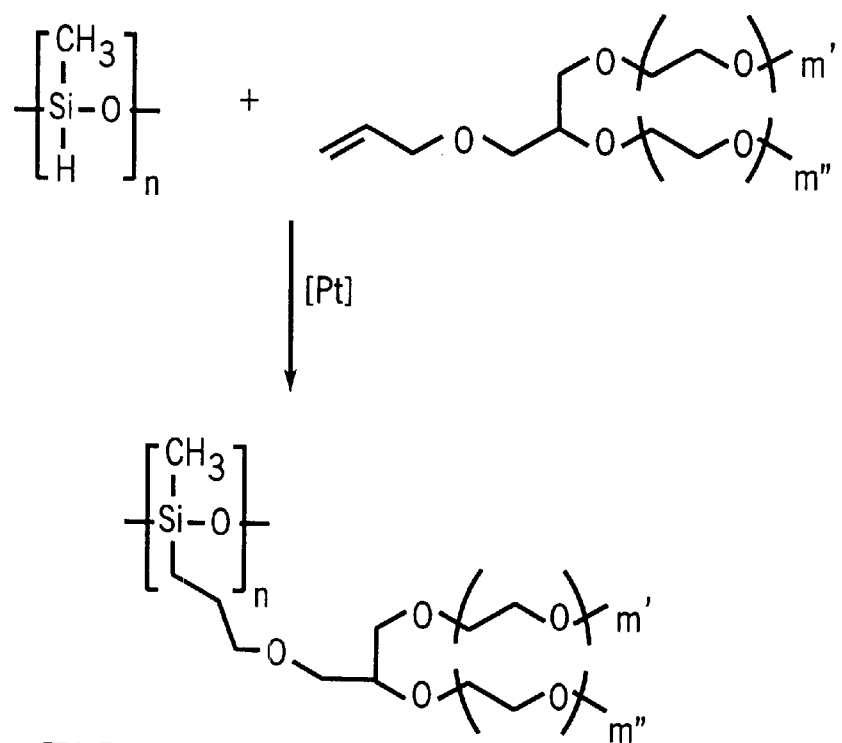
FIG. 7 is a schematic depiction of the synthesis of polymers of the present invention in which each silicon is substituted with a single branched side chain having two oligooxyethylene moieties.

We next polymerized these moieties. For example, as shown in FIG. 7, into a one neck round-bottom flask poly(methylhydrosiloxane) (1.01 g, 0.41 mmoles, Aldrich) together with the first compound of FIG. 6 (6.48 g, 15.2 mmoles) and H$_2$PtCl$_6$·6H$_2$O (100 μL, 0.2 M solution in iso-propanol) were dissolved in THF (80 mL). This reaction mixture was heated to 50° C. for 24 hours and cooled to room temperature. The solvent was removed under reduced pressure. A pale brown oil was isolated and washed three times with hexanes and again all volatile residues were removed under vacuum. The yield was 6.86 g. A GPC trace of this material showed one peak (Mw~18,000) and proton NMR spectroscopy showed no residual allyl or Si—H resonances. Silicon-29 NMR spectroscopy showed substituted polysiloxane ($\delta$=−21 ppm).

III. Disubstituted Multiple Branch Side Chains

Figure 8:
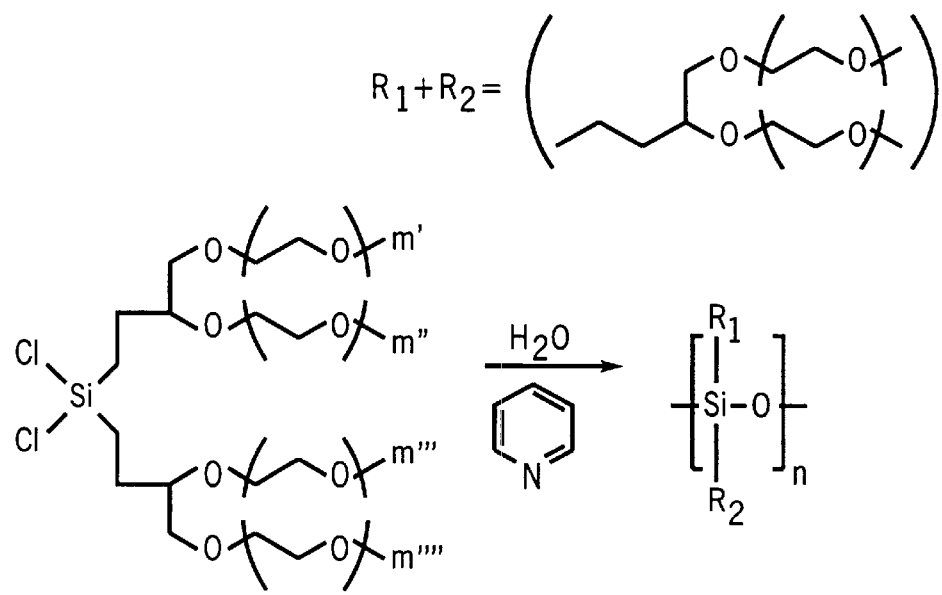
FIG. 8 is a schematic depiction of the synthesis of polymers of the present invention in which each silicon is substituted with two branched side chains, each having two oligooxyethylene moieties.

We then synthesized bis(3,4-bis(2-(2-(2-methoxyethoxy) ethoxy)ethoxy)butyl) dichlorosilane. See FIG. 8.

An oven-dried 1-neck 25 mL Schlenk flask, with a magnetic stir bar was attached to a nitrogen inlet. 3,4-bis(2-(2-(2-methoxyethoxy)ethoxy)ethoxy)butene (FIG. 6)(7.60 g, 0.02 mol) was syringed into the flask and cooled to 0° C. in an ice bath. Karstedt's catalyst (platinumdivinyltetramethyl-disiloxane complex in xylene) (0.05 mL) was syringed into the flask followed by a 25% dichlorosilane solution in xylene (4 g, 0.01 mol). The ice bath was removed and the flask was placed in liquid nitrogen to freeze the reaction mixture. A vacuum was pulled on the flask to reduce the pressure. The stopcock was closed and the reaction mixture was allowed to warm to room temperature. The reaction mixture was then heated to 60° C. and stirred for 3 days after which time the reaction was complete, evident by no Si—H peaks observed in both IR and $^1$H NMR. The dialkyldichlorosilane was purified by heating under vacuum at 200° C. to remove xylene, unreacted butene and other side products, specifically hydrogenated olefin.

We then polymerized 0.10 g of bis(3,4-bis(2-(2(2-methoxyethoxy)ethoxy)ethoxy)butyl) dichlorosilane (FIG. 8) by syringing it into a Schlenk flask and a water/pyridine mixture (1:2 mol ratio) was added dropwise and the reaction was stirred for 1 hour. The excess water/pyridine mixture was removed under reduced pressure. Diethyl ether was added to the resulting slurry which precipitated pyridinium chloride which was then filtered off. Diethyl ether was removed under reduced pressure yielding the polymer.

Figure 9:
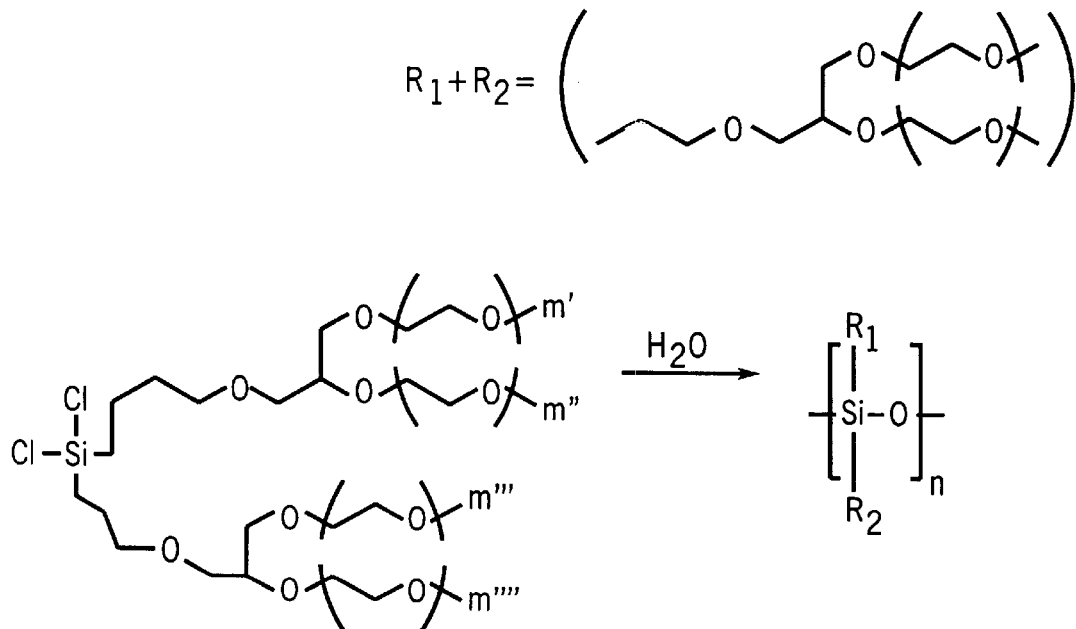
FIG. 9 is a schematic depiction of the synthesis of alternative polymers of the present invention in which each silicon is substituted with two branched side chains, each having two oligooxyethylene moieties.

FIG. 9 depicts the synthesis of yet another alternative polymer. To create this polymer we used the following procedures.

In a one-neck 250 mL round-bottom flask which can be closed at the top with a Teflon stopper was added the top compound of FIG. 6 (9.22 g, 21.7 mmoles) in 50 mL of THF. To this was added a catalytic amount of H$_2$PtCl$_6$·6H$_2$O(~1× 10$^{-5}$ M) and this was cooled in an ice-bath. Dichlorosilane (25% in xylene) was added via a syringe (10.85 mmoles, 466 mL) and the flask was sealed.

This flask was then cooled to liquid nitrogen temperature and the inert gas removed under vacuum. The flask was then sealed again and warmed slowly to room temperature. The reaction mixture was then heated at 60° C. for 16 hours and an aliquot removed under inert gas.

The mixture was then dissolved into 50 mL of anhydrous diethyl ether and transferred via syringe to a Schlenk flask. This was cooled in an ice bath and excess water was added to the reaction mixture rapidly. A white emulsion formed immediately and the reaction was stirred for a further 30 minutes. The product was extracted three times with 75 mL of dichloromethane, dried (MgSO$_4$) and solvent removed via reduced pressure. Yield of polymer (13.2 g, 68%). Further purification is accomplished by washing the low molecular weight fractions and byproducts away with hexanes solution. (See FIG. 9).

Figure 10:
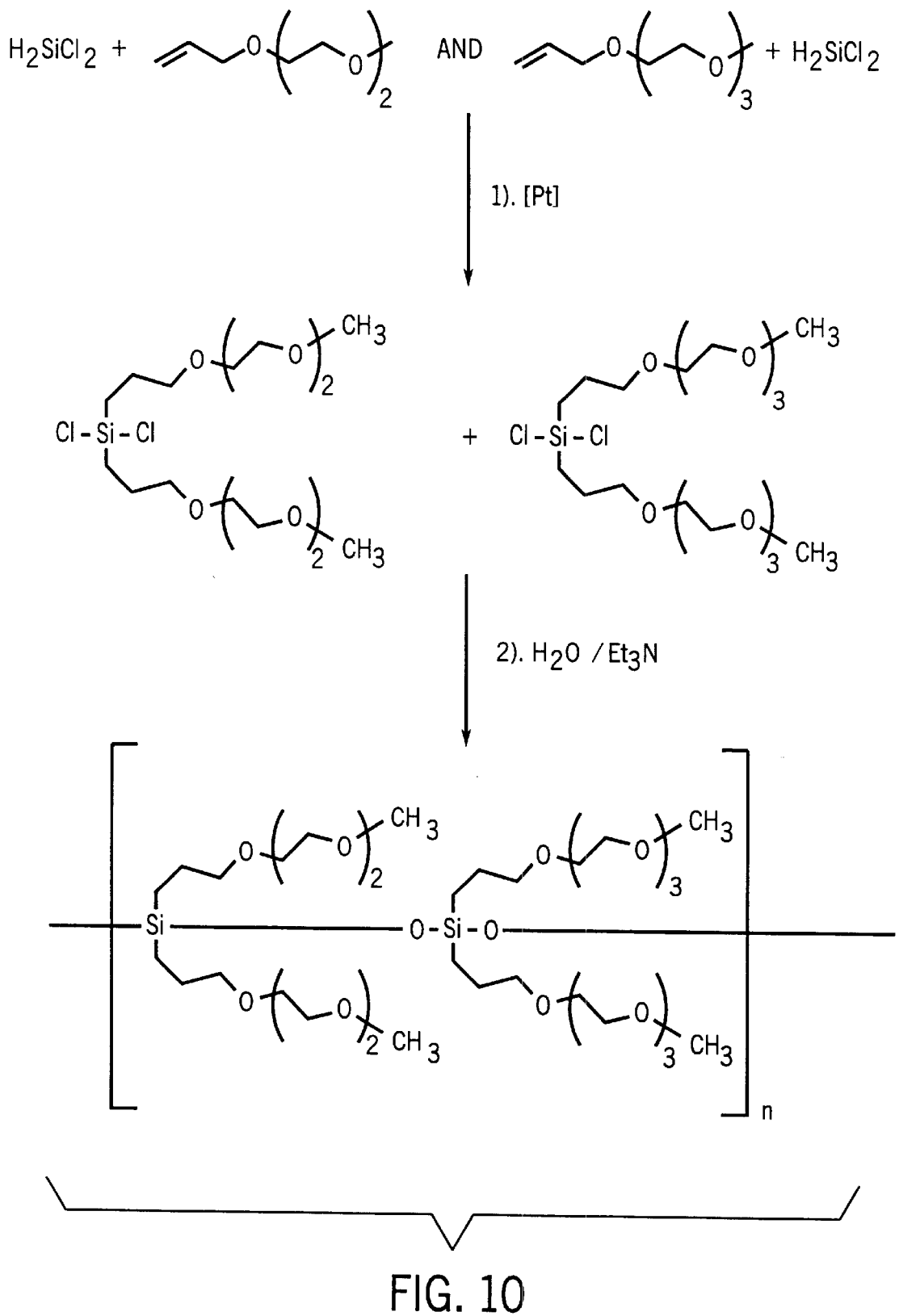
FIG. 10 is a schematic depiction of the synthesis of an alternative polymer of the present invention in which the content of the branch groups alternate from silicon to silicon.

FIG. 10 depicts the synthesis of a copolymer with branches alternating silicon to silicon. Dichlorosilane (1.98 g, 19.6 mmol, 25% solution in xylene) was added to a solution of triethylene glycol allyl methyl ether (8.0 g, 39.2 mmol) and chloroplatinic acid (20 µmoles) in THF (50 mL) at 0° C. Simultaneously, dichlorosilane (1.98 g, 19.6 mmol, 25% solution in xylene) was added to a solution of pentaethylene glycol allyl methyl ether (11.4 g, 39.2 mmol) and chloroplatinic acid (20 moles) in THF (50 mL) at 0° C. Both mixtures were heated at 60° C. for 12 h after which time the solvents were removed by heating under reduced pressure to yield light yellow oils: yield 9.98 g (100%) and 13.4 g (100%) respectively. Both of these products were dissolved into diethyl ether, together, and rapidly added to a water/triethylamine (11 mL, 78 mmol) solution to yield a brown oil. This oil was filtered to remove precipitated triethyl ammonium hydrochloride. Removal of solvent under reduced pressure yielded a yellow oil, yield 19.5 g (92%) in which the R groups alternated from silicon to silicon.

Figure 11:
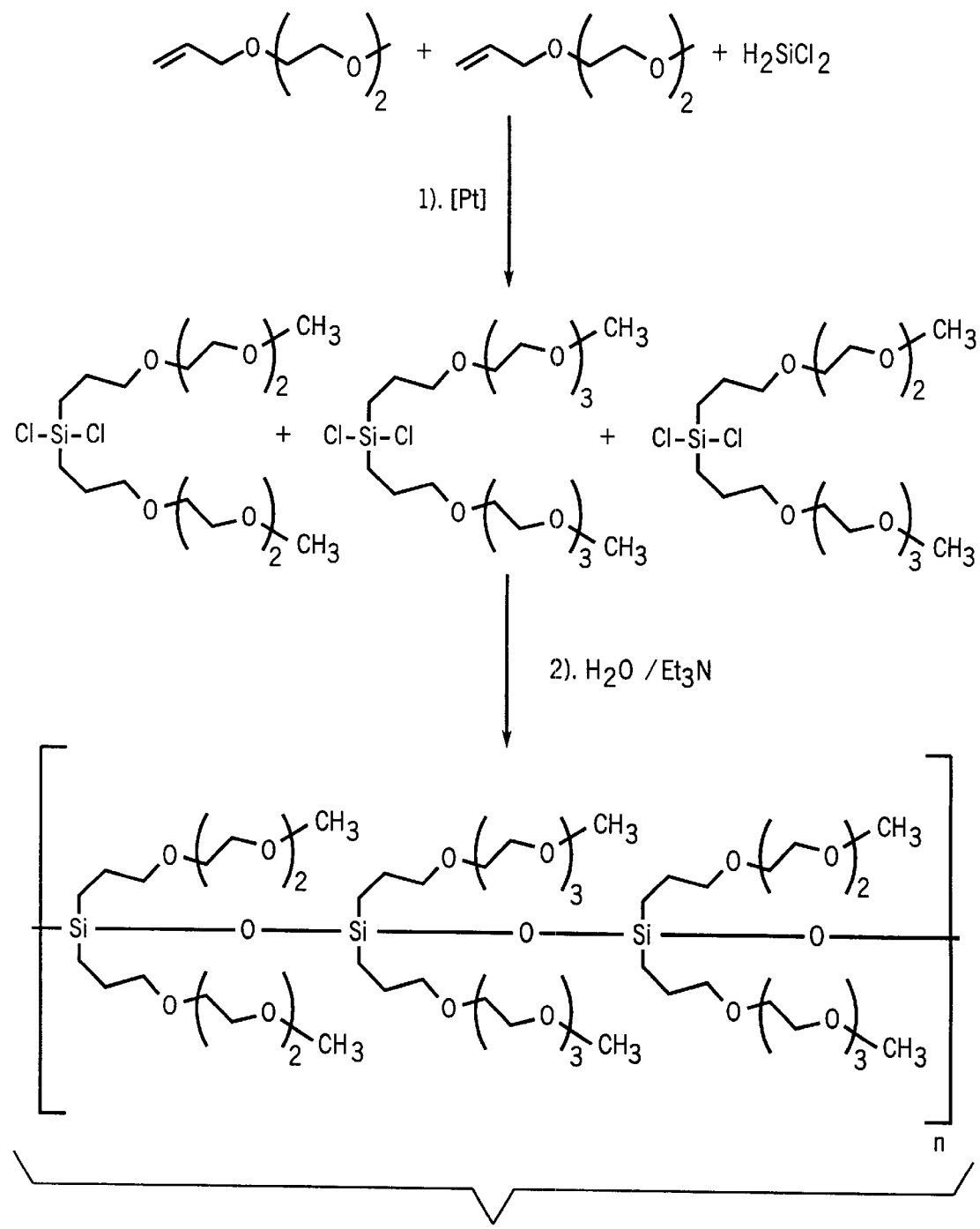
FIG. 11 is a schematic depiction of the synthesis of an alternative polymer of the present invention in which the content of the branch groups varies from silicon to silicon.

FIG. 11 depicts the synthesis of another copolymer. Dichlorosilane (4.33 g, 42.9 mmol, 25% solution in xylene) was added to a mixture of diethylene glycol allyl methyl ether (6.87 g, 42.9 mmol), triethylene glycol allyl methyl ether (8.76 g, 42.9 mmol), and chloroplatinic acid (20 µmoles) in THF (75 mL) at 0° C. This mixture was heated at 60° C. for 12 h after which time the solvents were removed by heating under reduced pressure to yield a light yellow oil: yield 19.3 g (99%). This product was dissolved into diethyl ether and rapidly added to a water/triethylamine (24 mL, 0.17 mol) solution to yield a brown oil. This oil was filtered to remove precipitated triethyl ammonium hydrochloride. Removal of solvent under reduced pressure yielded a yellow oil: yield 13.1 g, (68%).

Other Variants

A. synthesis of tetra(ethylene glycol)di-p-tosylate

Sodium hydroxide (50.05 g, 1.25 mol) was dissolved in 250 mL of distilled water and placed in a 2 L 3-neck flask with a magnetic stir bar and equipped with an addition funnel. Tetraethylene glycol (97.55 g, 0.50 mol) in 200 mL of THF was added and stirred for 2 hours. The flask was placed in an ice bath and p-toluenesulfonyl chloride (200.12 g, 1.05 mol) dissolved in 400 mL of THF was added dropwise slowly over 3 hours maintaining the ice bath. After complete addition of p-toluenesulfonyl chloride, the solution was allowed to warm to room temperature and stirred overnight (12 hours). The solution was then poured onto 1 L of ice water and the product was extracted with toluene (3×500 mL). The resulting organic extract was rinsed twice with water (500 mL) and once with saturated NaCl solution (500 mL). After removing all solvent, the product was recovered as a yellow oil (241.04 g, 95.5% yield).

B. synthesis of 2-(15-crown-5) ethene

Sodium Hydride (13.27 g, 80% dispersion in mineral oil, 0.44 mol) and 375 mL of THF were placed in a 1 L 3-neck flask equipped with a mechanical stirrer, reflux condenser and a 250 mL addition funnel. The solution was brought to reflux and a mixture of tetra(ethylene glycol)di-p-tosylate (100.52 g 20 mol), 1-butene-3,4-diol (17.64 g 20 mol), and 125 mL THF was added slowly dropwise over 3 hours. After complete addition, the reaction was refluxed for 18 hours. The solvent was removed yielding a dark yellow liquid. Product was recovered after distillation (23.3 g, 47.3%).

C. synthesis of poly[bis-2-(15-crown-5)ethyl]siloxane]

A 25% solution of dichlorosilane in xylene (17.2 mL, 16.16 g, 40 mmol) was added to a solution of 2-(15-crown-5) ethene (21.67 g, 88 mmol) and chloroplatinic acid (20 µmoles) in THF (30 mL) below 0° C. The mixture was frozen and vacuum pulled on the flask. The flask was sealed and the mixture was allowed to warm to room temperature then heated at 60° C. for 18 h after which time the solvents were removed by heating under reduced pressure to yield a light yellow oil (21.48 g, 90%). Water was added to 17.83 g of product to yield a viscous light yellow polymer. The polymer was dissolved in water and rinsed with toluene to remove any residual 2-(15-crown-5)ethene. Final yield= 12.27 g (76%).

Impedance Measurements

Polymer samples were dried overnight on a Schlenk line ($10^{-3}$ atm) and then on a high vacuum line ($10^{-6}$ atm) for a further 24 hours. These samples were then transferred into an argon filled dry box where all further manipulations were performed using Teflon-coated instruments.

In a typical experiment 1.5 g of polymer was weighed into a Teflon cup to which a magnetic stirring bar was added. These were placed into a glass vessel that was sealed using Young joints, o-rings, and a metal clamp. The apparatus was transferred to a Schlenk line where a solution of the Li salt in THF was added under a constant flow of argon gas. The mixture was stirred until a homogeneous solution was obtained, after which the solvent was removed under vacuum and the residual material was dried overnight at $10^{-3}$ atm. The residue was then transferred to the high vacuum line (<5.0 $10^{-5}$ atm) for a further 24 hours before being taken back into the dry box.

As an example calculation, for one polymer the molecular weight of the monomer unit was 470 g/mol, 1.5 g of polymer contained 3.2 mmoles of monomer unit that had 8 ethylene oxide oxygens, such that there were 25.5 mmoles of 'O' present in this sample. For a 48:1 ratio of O:Li, 0.53 mmoles LiN(SO$_2$CF$_3$)$_2$ was required. A stock solution of salt in THF was prepared and calculated as being 50 mM, thus 10.6 mL of this solution was added to the polymer to give the appropriate ratio of polymer to salt content.

Using Teflon spatulas and tweezers a two electrode conductivity cell was loaded with the doped polymer sample such that the o-ring, which defines the geometric area of the sample was full and contained no visible air pockets. The cell was sealed at either end with screw lids that contained o-rings so that no moisture would contact the polymer sample. The completed cell was brought out of the dry box and placed into a Faraday cage ready for impedance measurements.

Impedance measurements were performed under computer control using a EG&G Princeton Applied Research Model 273A potentiostat/galvanostat, EG&G Princeton Applied Research Model 5210 lock-in amplifier for frequency control (0.01 Hz to 10 Khz) and EG&G Princeton Applied Research Model 388 impedance software for data acquisition. Subsequently the data obtained was analyzed on a PC with Microsoft Excel. Room temperature conductivity measurements were at 23±1° C. while variable temperature measurements (0 to 70° C.) were made by placing the electrochemical cell in a jacketed holder and circulating ethylene glycol/water from a Lauda RMT6 circulating bath. Actual temperatures were determined via an Omega thermocouple attached directly to the cell.

The polymers of the present invention had surprisingly good conductivity, especially when compared to polysiloxane comb polymers that did not have multiple side chains of this type on each silicon.

It will be appreciated that the present invention is not to be limited to the specific examples described above. In this regard, there are numerous modifications that are meant to be within the scope of the invention. Thus, the claims should be looked to in order to judge the full scope of the invention.

INDUSTRIAL APPLICABILITY

The present invention provides compounds useful for various electrical purposes, including use in automotive lithium-based batteries.

We claim:

1. A compound having the following moiety:

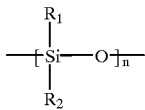

wherein each of $R_1$ and $R_2$ is individually selected for each n and is —$CH_2CH_2CH_2$—O—$(CH_2CH_2O)_m$—, with a carbon of each of the $R_1$ and $R_2$ being directly linked to said silicon; wherein m is individually selected for each $R_1$ and $R_2$ and each n and is at least 2 and less than 100; n is at least 2 and less than 1000; and wherein for at least one n $R_1$ and $R_2$ together total between ten and twelve oxygens.

2. The compound of claim 1, wherein m is the same for both $R_1$ and $R_2$ for all n's.

3. A compound having the following moiety:

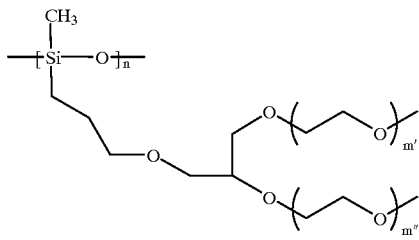

wherein m' and m" are each individually selected for each n and are each at least 2 and less than 100; and n is at least 1 and less than 1000.

4. The compound of claim 3, wherein n is at least 2.

5. The compound of claim 4, wherein m' and m" are the same as each other, and are the same for all n's.

6. A compound having the following moiety:

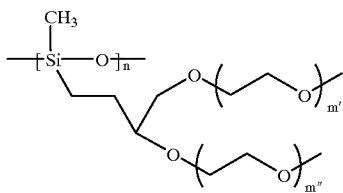

wherein m' and m" are each individually selected for each n and are each at least 2 and less than 100; and n is at least 1 and less than 1000.

7. The compound of claim 6, wherein n is at least 2.

8. The compound of claim 7, wherein m' and m" are the same as each other, and are the same for all n's.

9. A compound having the following moiety:

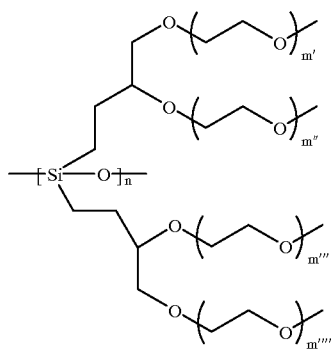

wherein m', m", m'", and m"" are each individually selected for each n and each is at least 2 and less than 100; and n is at least 1 and less than 1000.

10. The compound of claim 9, wherein n is at least 2.

11. The compound of claim 10, wherein m', m", m'", and m"" are the same as each other for all n's.

12. A compound having the following moiety:

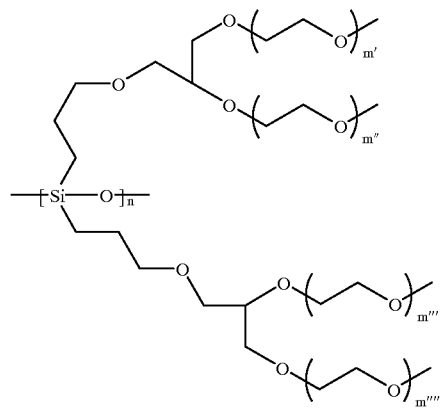

wherein m', m", m'", and m"" are each individually selected for each n and each is at least 2 and less than 100; and n is at least 1 and less than 1000.

13. The compound of claim 12, wherein n is at least 2.

14. The compound of claim 13, wherein m', m", m''', and m'''' are the same as each other for all n's.

15. A compound of the formula $R_1R_2SiCl_2$:

wherein $R_1$ is —$CH_2CH_2CH_2$—O—$(CH_2CH_2O)_{m'}$—T;

wherein $R_2$ is —$CH_2CH_2CH_2$—O—$(CH_2CH_2O)_{m''}$—T;

wherein a carbon of each of the $R_1$ and $R_2$ are directly linked to said silicon;

wherein m' and m" are each individually selected and are each at least 2, wherein the number of oxygens in $R_1$ and $R_2$ together totals between ten an twelve; and wherein T is individually selected for $R_1$ and $R_2$ and are selected from the group consisting of hydrogen, halogen, alkyl having less than 30 carbons, alkyl silyl having less than 30 carbons, arylalkyl having less than 30 carbons, and aryl having less than 30 carbons.

\* \* \* \* \*

UNITED STATES PATENT AND TRADEMARK OFFICE
CERTIFICATE OF CORRECTION

PATENT NO.    : 6,337,383 B1                                              Page 1 of 1
DATED         : January 8, 2002
INVENTOR(S)   : Robert C. West, Richard Hooper and David A. Moline It is certified that error appears in the above-identified patent and that said Letters Patent is hereby corrected as shown below:

<u>Column 14,</u>
Line 3, replace "ten an twelve" with -- ten and twelve --.

Signed and Sealed this

Twenty-eighth Day of May, 2002

*Attest:*

*Attesting Officer*

JAMES E. ROGAN
*Director of the United States Patent and Trademark Office*